United States Patent
Kuroda

[11] Patent Number: 5,984,403
[45] Date of Patent: Nov. 16, 1999

[54] FRAME STRUCTURE FOR VEHICLE BODY

[75] Inventor: Hirokazu Kuroda, Ota, Japan

[73] Assignee: Fuji Jukogyo Kabushiki Kaisha, Tokyo-To, Japan

[21] Appl. No.: 08/955,528

[22] Filed: Oct. 22, 1997

[30] Foreign Application Priority Data

Oct. 25, 1996 [JP] Japan ................................. 8-300939

[51] Int. Cl.⁶ ................................................. B62D 21/00
[52] U.S. Cl. ...................... 296/189; 296/203.02; 280/784
[58] Field of Search .................................... 296/187, 188, 296/189, 203.01, 203.02, 203.04, 204, 205; 280/781, 784; 52/696, 729.3

[56] References Cited

U.S. PATENT DOCUMENTS

| | | | |
|---|---|---|---|
| 2,627,426 | 2/1953 | Toncray et al. | 296/203.01 X |
| 4,702,515 | 10/1987 | Kato et al. | 296/189 |
| 4,950,031 | 8/1990 | Mizunaga et al. | 296/189 |
| 5,118,160 | 6/1992 | Kitagawa et al. | 296/189 |
| 5,171,058 | 12/1992 | Ishikawa | 296/189 |
| 5,314,229 | 5/1994 | Matuzawa et al. | 296/189 |

*Primary Examiner*—D. Glenn Dayoan
*Assistant Examiner*—Chad Wells
*Attorney, Agent, or Firm*—Smith, Gambrell & Russell

[57] ABSTRACT

In the front frame (1) for a vehicle body formed with a bendable portion (1a) midway thereof, the bending deformation due to a bending moment M1 generated at the bendable portion (1a) of the front frame (1) in case of a vehicle collision is suppressed to improve the effect of absorbing collision energy. A pair of front and rear bead portions (5) arranged in a V shape are formed on the side surface of the bendable portion (1a) of the front frame (1) in such a way that the space between the two opposing bead portions (5) increases gradually from the upper compression side to the lower tension side. Therefore, in case of a vehicle frontal collision, it is possible to generate an additional moment M which can cancel out the bending moment M1 generated at the bendable portion (1a) due to the shape factor of the front frame, so that the deformation mode of the front frame (1) can be changed from the bending mode to a nearly buckling mode. As a result, it is possible to improve the effect of absorbing collision energy in case of a vehicle collision.

6 Claims, 3 Drawing Sheets

FRAME STRUCTURE FOR VEHICLE BODY

BACKGROUND OF THE INVENTION

1. Field of the Invention

The present invention relates to a frame structure used for a vehicle body.

2. Description of the Prior Art

In general, the front frame structure of a vehicle body is composed of right and left front frames and a lower radiator frame. Here, each of the right and left front frames is formed into a box-shaped cross section so as to extend in the longitudinal (front to rear) direction of the vehicle along the inner side of each of right and left front wheel aprons both constructing side walls of an engine compartment. On the other hand, the lower radiator frame is used to join the front ends of the right and left front frames. Further, the rear ends of the right and left front frames are usually butt-joined to a toe board for partitioning the engine compartment from a vehicle compartment.

In the conventional vehicle front frame structure as described above, in case of vehicle collision, it is necessary to effectively absorb shock energy by allowing the two front frames to be deformed in buckling mode. For this purpose, conventionally, in order to allow the front frames to be deformed in buckling mode in case of vehicle collision, a measure has been adopted to form a plurality of bead portions extending in the vertical direction on at least one side surface of the box-shaped front frame, as disclosed in Japanese Patent Application Laid-Open Publication No. 3-94137 or in Japanese Utility Model Application Laid-Open Publication No. 3-16580, for instance.

Here, it is basically ideal to form each of the two front frames as a straight part extending in the front to rear direction, in the practical vehicle design. However, the shape of the front frames is severely restricted due to various parts to be arranged in the engine compartment, so that the front frames 1 are inevitably formed with a bent portion 1a roughly midway portion thereof, as shown in FIG. 4. Further, in FIG. 4, each front frame 1 is fixed between a front wheel apron 2 and a toe board 3, and the front frame 1 is further formed with a plurality of vertical bead portions 4.

In the conventional front frame structure as described above, having a plurality of bead portions 4 extending in the vertical direction and formed on the side surface of the front frame with the bent portion 1a formed roughly midway thereof, in case a collision load F is applied to the front end of the front frame 1 and thereby a bending moment M1 is generated at the bent portion 1a, the vertical bead portions 4 cannot effectively suppress the bending deformation at the bent portion 1a, depending on the way of arrangement of the bead portions, with the result that there exists a problem in that collision energy cannot be absorbed effectively. In other words, in the conventional front frames, there exists a problem in that it is difficult to determine how the vertical bead portions 4 are arranged.

SUMMARY OF THE INVENTION

It is an object of the present invention to provide a frame structure for a vehicle body, which can absorb a collision load effectively in buckling deformation mode.

To achieve the above object, the present invention provides a frame structure for a vehicle body with a frame having a box-shaped cross section and formed with a portion bendable when a collision load is applied in a longitudinal direction of the frame in case of a vehicle collision, comprising a pair of bead portions arranged in a roughly V shape and formed on at least one of two opposite surfaces of the frame, in such a direction that a bending moment generated at the bendable portion of the frame can be canceled out by an additional moment generated by the pair of the bead portions in case of a vehicle collision.

Here, it is preferable that a space between a pair of the bead portions arranged roughly in V shape increases gradually from a compression side to a tension side of the bending moment generated at the bendable portion of the frame.

Further, it is preferable that the bendable portion of the frame is of a downwardly convex shape so that in case of a vehicle collision an upper side of the bendable portion is compressed and a lower side thereof is extended, and that the bead portions are arranged in a roughly inverted V shape.

Further, it is preferable that the bendable portion of the frame is of an upwardly convex shape so that in case of a vehicle collision a lower side of the bendable portion is compressed and an upper side thereof is extended, and that the bead portions are arranged in a roughly V shape.

Further, the present invention provides a frame structure for a vehicle body with a straight frame having a box-shaped cross section without forming any bendable portion, wherein a pair of bead portions arranged in a roughly V shape or in a roughly inverted V shape are formed on at least one of the two opposite surfaces of the box-shaped cross-sectional frame so that a bending moment will be generated to positively bend the frame in case of a vehicle collision.

In the frame structure for a vehicle body according to the present invention, it is possible to cancel the bending moment generated at the bendable portion by another moment generated by a pair of the bead portions arranged in the roughly V-shape or inverted V-shape in case of a vehicle collision, so that the resistance to the frame bending deformation is increased, whereby the deformation mode can be changed from the bending mode to a nearly buckling mode in case of a vehicle collision. As a result, it is possible to improve the effect of absorbing the collision energy.

Further, in the frame structure for a vehicle body according to the present invention, a pair of bead portions arranged in a roughly V shape or roughly inverted V shape are formed on the side surface of a straight frame, so that it is possible to positively generate a bending moment by the pair of the bead portions at any desired position and in any desired direction of the straight frame. As a result, the frame can be bent positively in case of a collision.

DESCRIPTION OF THE PREFERRED EMBODIMENTS

Preferred embodiments of the present invention will be understood from the following detailed description referring to the accompanying drawings.

Figure 1:
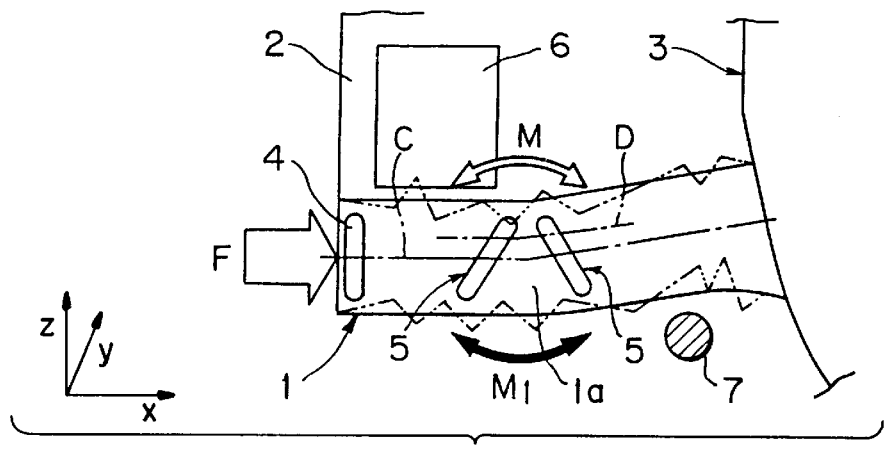
FIG. 1 is a side view showing a first embodiment of the frame structure for a vehicle body according to the present invention.

In the side view shown in FIG. 1, in the same way as with the case of the prior art front frame, a front frame 1 is formed into a box-shaped cross section so as to extend in the longitudinal direction of the vehicle along the inner side of a front wheel apron 2. Further, the rear end portion of the front frame 1 is butt-welded to the toe board 3.

Here, it is basically ideal that the two front frames 1 are each formed as a straight part extending in the front to rear direction. In practice, however, the shape of the front frames are severely restricted by various parts (e.g., a battery 6, an axle shaft 7, etc.) all to be arranged in the engine compartment, so that the front frame 1 is inevitably formed with a slightly bent portion 1a roughly midway of the front frame. Further, in FIG. 1, the front frame 1 is formed in such a way that the rear end portion thereof is bent upward relative to the front portion thereof at the bent portion 1a of the front frame 1. Therefore, in case a collision load F is applied to the front frame 1, the front frame 1 is deformed in such a way that the upper portion of the bent portion 1a becomes a compression side and the lower portion thereof becomes a tension side, so that a bending moment M1 is generated in such a way that the bent portion 1a is deformed into a convex shape toward the lower side.

In the front frame 1 formed with the bent portion 1a as described above, in the present invention, a pair of bead portions 5 are formed on the side surface of the bent portion 1a in such a way that the space between the two adjacent bead portions 5 increases gradually from the upper side (compression side) to the lower side (tension side), that is, in a roughly inverted V shape with a space at the apex thereof. Owing to this roughly inverted V-shaped arrangement of a pair of the bead portions 5, it is possible to generate a moment M in such a direction as to cancel out the bending moment M1 generated at the bent portion 1a due to the shape factor of the front frame 1.

The reason why the moment M can be generated by a pair of the bead portions 5 arranged roughly in the inverted V shape will be explained in further detail below with reference to FIG. 2.

Figure 5:
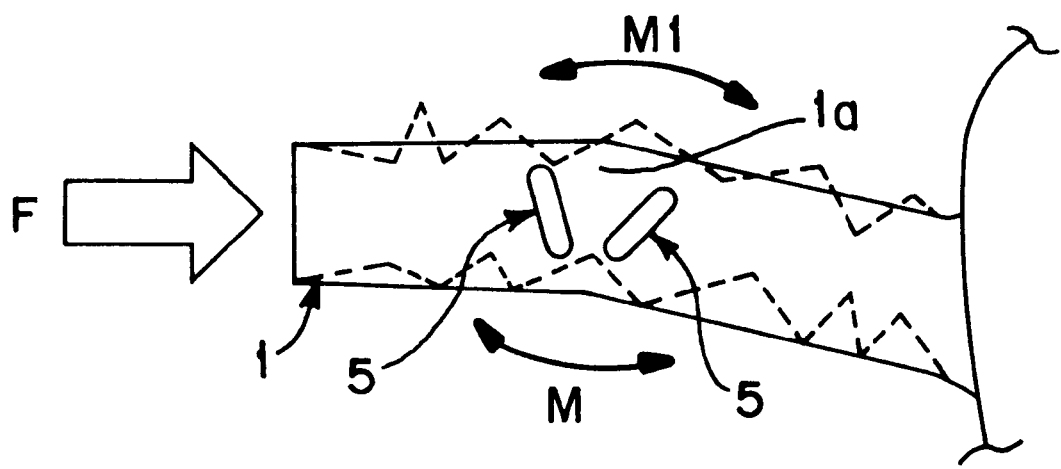
FIG. 5 is a side view showing an additional variation of the frame structure for a vehicle body according to the present invention.

In the side view shown in FIG. 5, which corresponds in many particulars with FIG. 1, the bendable portion 1a of the frame 1 is of an upwardly convex shape so that in the case of a force applied in direction F, as in a front-end collision, the lower side of the bendable portion is compressed and the upper side thereof is extended. A bending moment M1 is thus generated in such a way that the bent portion 1a is deformed into a convex shape toward the upper side. As shown and described above as to FIG. 1, the bead portions 5, being in this case in a normally oriented roughly V-shape with a space at the lower portion thereof, make it possible to generate the moment M in such a direction so as to cancel out the bending moment M1 generated at the bent portion 1a due to the shape factor of the front frame 1.

Figure 2:
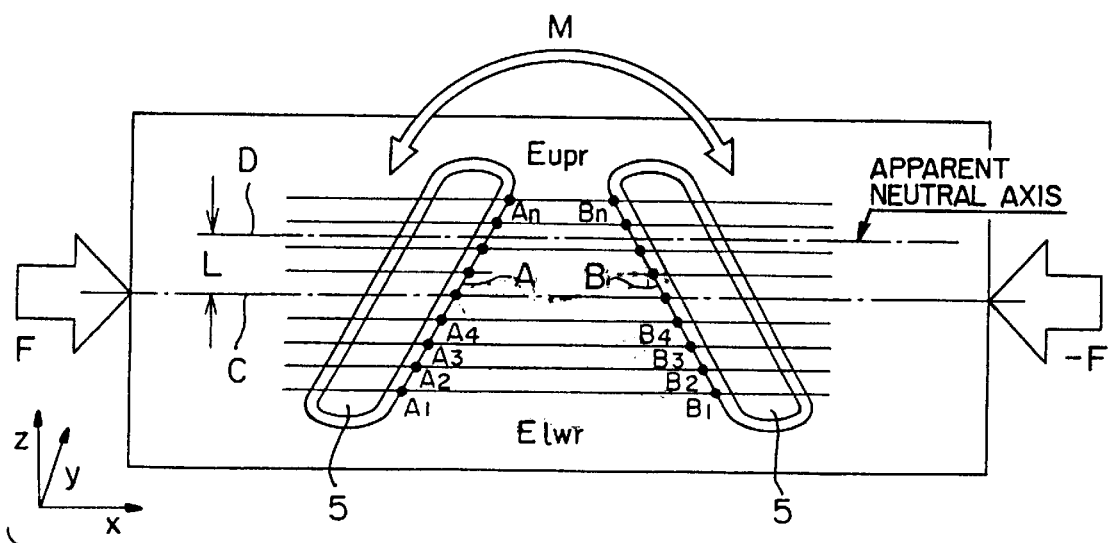
FIG. 2 is an illustration for assistance in explaining the principle of the frame structure according to the present invention.

Here, in FIG. 2, the assumption is made that the two opposing bead lines A and B of a pair of the front and rear bead portions 5 arranged in the roughly inverted V shape have such a sufficient rigidity as to restrict the displacements at points $A_n$ and $B_n$ in X, Y and Z directions, respectively, where X denotes the front to rear direction; Y denotes the right to left direction; and Z denotes the vertical direction. Further, the origin of the three dimensional coordinates differs according to the vehicle. Under these conditions, it is possible to assume that the segments between $A_n$ and $B_n$ are a plurality of beam elements simply supported at both ends thereof.

Therefore, when Euler's buckling theory is adopted, the following relationship can be established between the buckling load $P_E$ applied to the beam element formed between $A_n$ and $B_n$ and the beam length $L_n$:

$$P_E \, 1/L_n (\text{the segment } A_n - B_n = L_n) \qquad (1)$$

In the plane on which the two front and rear beads are arranged roughly in the inverted V shape, the beam length $L_n$ on the lower side is longer than that on the upper side. Therefore, the buckling load $P_E$ on the lower side (where the beam length is longer) is lower than that on the upper side (where the beam length is shorter), and further the apparent Young's modulus E can be defined on the basis of the above formula (1) as follows:

$$E_{upr} > E_{lwr} \qquad (2)$$

where $E_{upr}$ denotes the upper side Young's modulus and $E_{lwr}$ denotes the lower side Young's modulus.

The above relationship (2) indicates that when a pair of the front and rear bead portions are arranged in the roughly inverted V shape, an apparent neutral axis D can be newly produced in addition to the neutral axis C defined on the simple plane. Therefore, synthesizing the above assumption and the theory, when a load F is applied to a panel (the front frame 5) as shown in FIG. 2, a moment M can be generated due to an offset L between the original neutral axis C (the load application point) and the apparent neutral axis D.

When the above phenomenon is used under consideration of the deformation mode (bending characteristics) generated on the basis of the shape factor of the front frame; that is, when a pair of the front and rear bead portions 5 are arranged in the roughly inverted V shape in such a way that the newly generated moment M can cancel the bending moment M1 generated at the bent portion 1a of the front frame as shown in FIG. 1, it is possible to change the deformation mode of the front frame 1 due to a collision load F to the buckling mode (as shown by chain lines in FIG. 1) without limit. As a result, it is possible to allow the front frame 1 to have a high resistance against an applied collision load; in other words, it is possible to improve the effect of absorbing collision energy.

Further, in the first embodiment shown in FIG. 1, in order to reduce the peak resistance generated at the initial stage of the frontal collision and thereby to allow the buckling deformation to be started smoothly, a vertical bead portion 5, is formed at the front end portion of the front frame 1 in the same way as with the case of the prior art front frame. However, without being limited only to this example shown in FIG. 1 (in which the vertical bead portion is formed toward the front end portion of the front frame 1), it is possible to form the vertical bead portions 4 at any portions except near the bent portion 1a according to the necessity.

Figure 3:
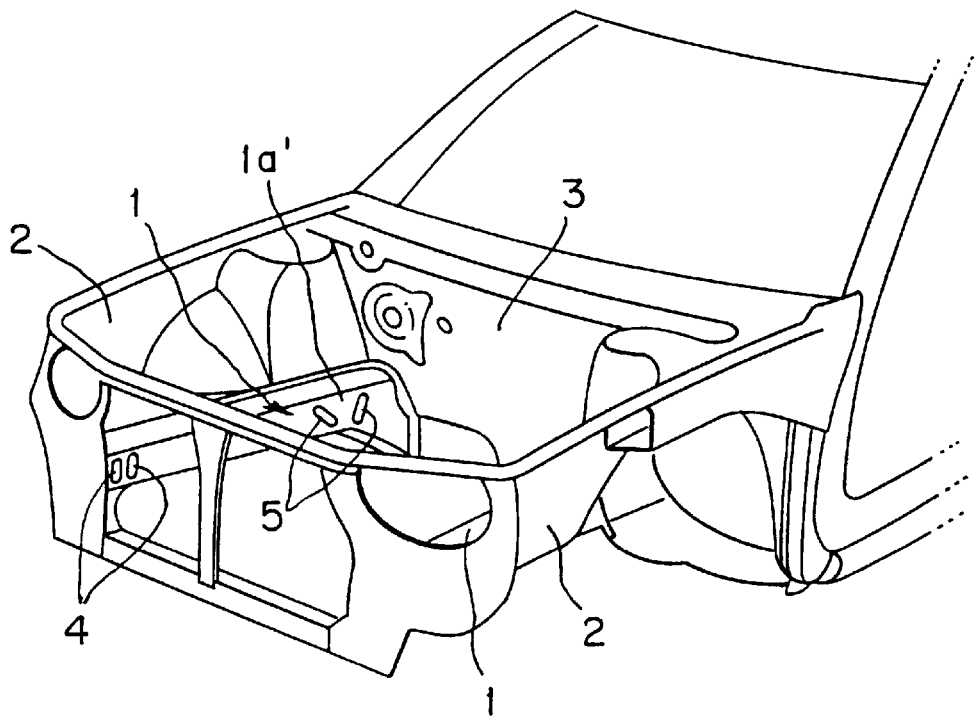
FIG. 3 is a perspective view showing a second embodiment of the frame structure for a vehicle body according to the present invention.
Figure 4:
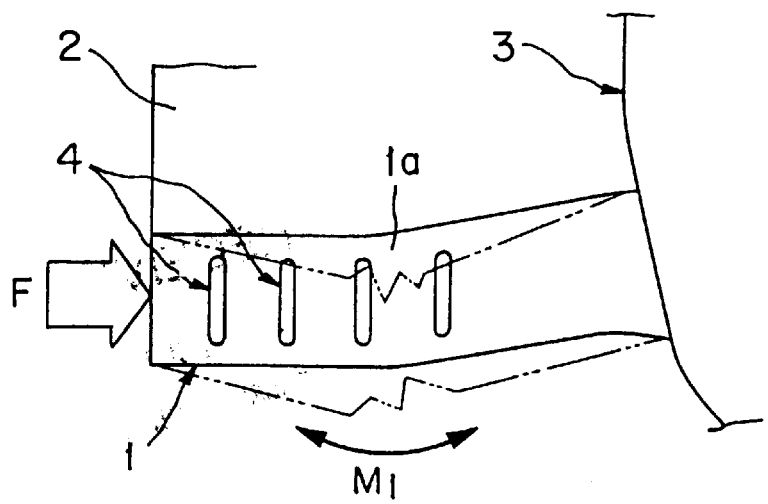
FIG. 4 is a side view showing an example of the prior art front frame structure of a vehicle body.

Further, in the first embodiment shown in FIG. 1, a pair of the inverted V-shape arranged bead portions 5 are formed at the bent portion 1a in such a way that the convex deformation can be produced downward (the upper side compression side and the lower side tension side). Without being limited only thereto, however, it is possible to form a pair of V-shape arranged bead portions 5, as shown in FIG. 3. In this second embodiment as shown in FIG. 3, a pair of the V-shape arranged bead portions 5 are formed on a front frame 1 having a bent portion 1a' in such a way that the convex deformation can be produced upward (the upper side tension side and the lower side compression side). In more detail, a pair of bead portions 5 are formed on the side surface of the front frame in such a way that the space between the two adjacent bead portions increases gradually from the lower side (compression side) to the upper side (tension side), that is, the two bead portions 5 are formed in a roughly V shape with a space at the apex thereof. Owing to this roughly V-shaped arrangement of a pair of the bead portions 5, it is possible to generate a new moment M in such a direction as to cancel out the bending moment M1 generated at the bent portion 1a' of the front frame 1 due to the shape factor. Further, in FIG. 3, the same reference numerals have been retained for the similar parts or elements having the same functions as with the case of the first embodiment shown in FIG. 1.

Further, in the first and second embodiments, the V-shaped bead portions of the present invention have been applied to the front frame formed with the portions 1a and 1a' which are bendable in the vertical direction. Without being limited thereto, the bead portions used in the present invention can be applied to the front frame formed with the portions bendable in the horizontal direction. In the case of the front frame formed with the horizontally bent portion, a pair of bead portions are formed on the side surface of the bent portion in such a way that the space between the two adjacent bead portions increases gradually from the lower or upper side (compression side) to the upper or lower side (tension side) in roughly the V shape or inverted V shape with a space at the apex thereof. In these cases, the same effect as above can be obtained.

In the above embodiments, the front frame formed with the bent portion can prevent the bending deformation in case of frontal vehicle collision and further the deformation mode of the front frame due to a collision load F can be changed to the mode similar to the buckling mode without limit. Without being limited thereto, the present invention can be applied to a straight front frame. That is, when it is necessary to control the position and the direction of the bending deformation positively in case of vehicle frontal collision in the straight front frame, it is possible to obtain the same effect as above, by appropriately forming a pair of the bead portions arranged in roughly inverted V shape or in roughly inverted V shape according to the required bending position and direction.

In addition, the gist of the present invention can be applied to any frames such as rear frames, without being limited to the front frames.

According to the present invention, in the vehicle frame formed with a bent portion which can be deformed by allowing one side to be compressed and the other side to be extended, a pair of bead portions arranged in roughly V shape are formed in such a way that the space between the two adjacent bead portions increases gradually from the compression side to the extension side, whereby it is possible to cancel the bending moment M generated at the bent portion by the additional moment M1 newly generated by a pair of the bead portions arranged in the roughly V shape, so that the frame deformation mode can be changed from the bending mode to an approximately buckling mode. As a result, the effect of absorbing the collision energy can be improved.

Further, in a straight front frame without a bent portion, if the front frame is required to be bent positively at a predetermined position and in a predetermined direction in case of vehicle collision, a pair of the bead portions arranged in a V-shape are formed at the position where the front frame is required to be bent or deformed. In this case, since the moment can be easily generated at the bead portions in the desired direction in case of vehicle collision, it is possible to improve the effect of absorbing collision energy.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A frame structure for a vehicle body with a frame having a box-shaped cross section and a portion bendable when a collision load is applied in a longitudinal direction of the frame in case of a vehicle collision, comprising:

a pair of bead portions arranged in a roughly V shape and formed on at least one of two opposite surfaces of the frame, in such a direction that a bending moment generated at said bendable portion of the frame can be canceled by an additional moment generated by said pair of the bead portions in case of a vehicle collision.

2. The frame structure for a vehicle body according to claim 1, wherein:

said frame has a space between the bead portions arranged roughly in a V shape, which increases gradually from a compression side to a tension side of the bending moment generated at said bendable portion of the frame.

3. The frame structure for a vehicle body according to claim 1, wherein:

said bendable portion of the frame is of a downwardly convex shape so that in case of a vehicle collision an upper side of the bendable portion is compressed and a lower side thereof is extended and wherein the bead portions are arranged in a roughly inverted V-shape.

4. The frame structure for a vehicle body according to claim 1, wherein:

said bendable portion of the frame is of an upwardly convex shape so that in case of a vehicle collision a lower side of the bendable portion is compressed and an upper side thereof is extended and wherein the bead portions are arranged in a roughly V-shape.

5. A frame structure for a vehicle body with a straight frame having a box-shaped cross section, comprising:

a pair of bead portions arranged in a roughly V shape and formed on at least one of two opposite surfaces of the frame, such that a bending moment will be generated on said frame to positively bend the frame in case of a vehicle collision.

6. A frame structure for a vehicle body with a straight frame having a box-shaped cross section, comprising:

a pair of bead portions arranged in a roughly inverted V shape and formed on at least one of two opposite surfaces of the frame, such that a bending moment will be generated on said frame to positively bend the frame in case of a vehicle collision.

* * * * *